Aug. 11, 1964  R. J. DU BUC ETAL  3,143,795
METHOD OF MAKING A PIVOT NUT FOR A BRAKE ADJUSTER
Filed April 7, 1961  3 Sheets-Sheet 1

INVENTORS
ROBERT J. DUBUC
JOHN K. NICE
FRANCIS A. HORNING
BY John A. Young
ATTORNEY Aug. 11, 1964  R. J. DU BUC ETAL  3,143,795
METHOD OF MAKING A PIVOT NUT FOR A BRAKE ADJUSTER
Filed April 7, 1961  3 Sheets-Sheet 2

INVENTORS
ROBERT J. DUBUC
JOHN K. NICE
FRANCIS A. HORNING
BY John A. Young
ATTORNEY Aug. 11, 1964  R. J. DU BUC ETAL  3,143,795
METHOD OF MAKING A PIVOT NUT FOR A BRAKE ADJUSTER
Filed April 7, 1961  3 Sheets-Sheet 3

INVENTORS
ROBERT J. DUBUC
JOHN K. NICE
FRANCIS A. HORNING
BY John A. Young
ATTORNEY

United States Patent Office 3,143,795
Patented Aug. 11, 1964

3,143,795
METHOD OF MAKING A PIVOT NUT FOR A BRAKE ADJUSTER
Robert J. Dubuc, John K. Nice, and Francis A. Horning, South Bend, Ind., assignors to The Bendix Corporation, South Bend, Ind., a corporation of Delaware
Filed Apr. 7, 1961, Ser. No. 101,408
1 Claim. (Cl. 29—543)

This invention relates to a method of making a brake adjuster, and more particularly to methods of producing a brake adjuster which is located between one pair of adjacent shoe ends to communicate applying force between the brake shoes and is also extendible to spread the connected shoe ends in order to compensate for wear of the brake shoes.

A well known adjuster with which the device of the invention is illustrated comprises essentially three components: (1) a pivot nut, this part consisting of a sleeve having an internally threaded opening and a slotted end which fits over the web of one of the brake shoes to prevent rotation of the sleeve; (2) an adjuster bolt which is in the form of a threaded stem rotatable by means of an integral star wheel or ratchet wheel either by manual or automatic operation, whereby the stem advances into or out of the threaded sleeve so that the adjuster assembly is elongated or shortened and the distance between the connected shoe ends correspondingly determined; and (3) a socket having a slotted end which fits over the end of the other brake shoe to prevent its rotation and includes an internal opening for receiving an end of said stem.

It was common practice, prior to the present invention, to drill a longitudinal passage within the pivot nut terminating at a closed end of the sleeve. The passage was then tapped to extend the threads substantially the entire length of the threaded passage because when the brake is new the adjuster must be foreshortened to a maximum extent to provide minimum length for the adjuster whereby the linings will clear the opposed drum surface.

Numerous technical difficulties were involved in drilling and threading this dead end passage opening and these difficulties added to the cost of producing the adjuster. For some applications cutting threads in the bottleneck portion of the pivot nut is advisable and is within the teachings of the present invention. It is still advantageous to form the threads in this manner because of the reduction in length for which threading is required and many of the benefits of the invention are still realized. For example, the tap which was used for cutting threads produced chips and other bits of material which became entrapped within the sleeve and produce tool breakage as well as breakage of the part being produced. Another disadvantatge of this previous method is that the threaded openings are non-uniform in diameter. At the open end of the passage the material is more flexible than at the closed end of the passage, with the result that the thread diameter varies along the length of the passage and at times produces either freezing of the threaded connection or excessive looseness of the threaded connection. These diffculties have been tolerated in the art over a substantial length of time but with the advent of the automatic adjuster, closer control of the thread fit is essential to ensure turning of the parts by the automatic adjuster mechanism.

Accordingly, it is one of the objects of the present invention to provide improved processes for producing the adjuster whereby tool life can be prolonged.

Another object of the present invention is to provide a process for producing a pivot nut in which the threads are formed not by a cutting operation, but by a rolling operation in which the threads are shaped by displacing metal from one location to another as opposed to cutting and removing the metal.

Another object of the invention is to provide a novel process for producing a threaded connection between an adjuster pivot nut and bolt and further to produce a novel connection between the bolt and socket.

Other objects and features of the present invention will become apparent from a consideration of the following description which proceeds with reference to the accompanying drawings, wherein a plurality of selected embodiments are illustrated by way of examples of the invention.

Figure 1:
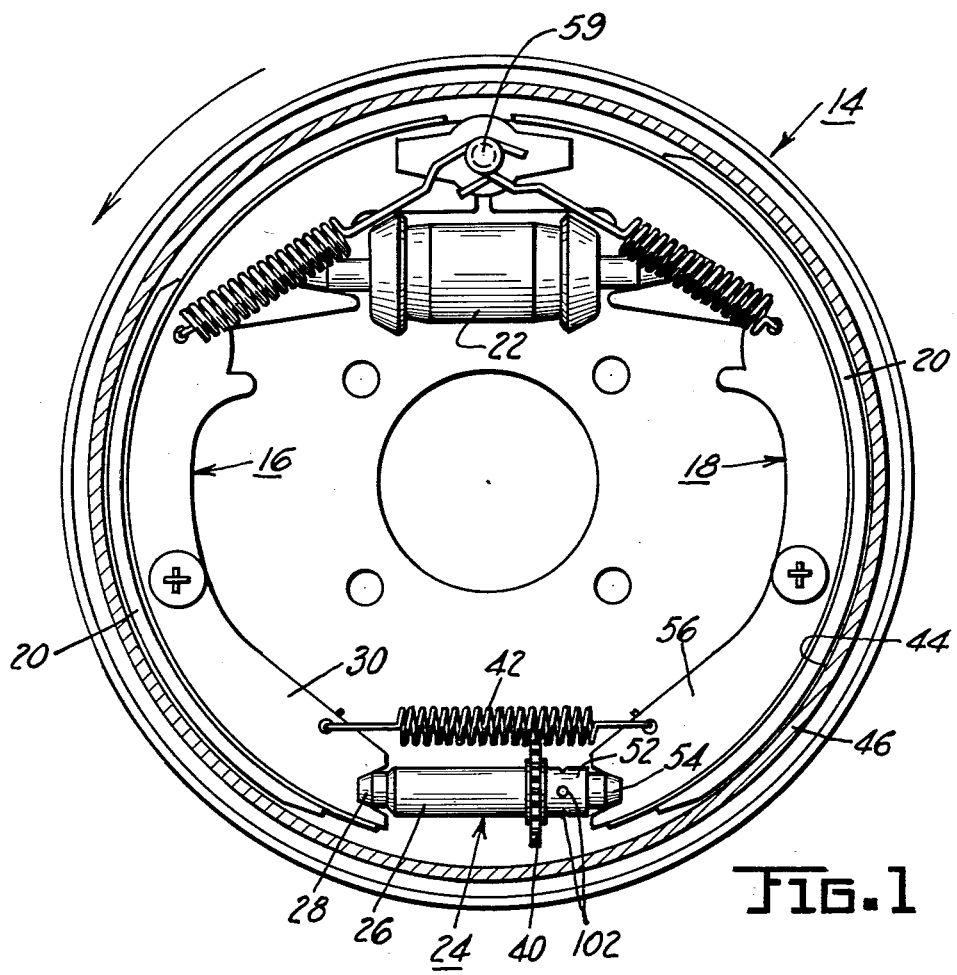
FIGURE 1 is a side elevation view of the brake having the present invention incorporated therein.

Referring now to the drawings the brake designated generally in FIGURE 1 by reference numeral 14 includes a pair of T-section brake shoes 16 and 18 having friction material lining 20. One pair of adjacent brake shoe ends are spreadable by a fluid motor actuator 22 with oppositely acting pistons (not shown) which move the ends of the shoes outwardly and the opposite pair of adjacent ends is connected by an adjuster strut 24. The adjuster strut 24 includes a pivot nut 26 having a slotted end 28 which fits over the web 30 of the brake shoe 16 to prevent its rotation. The threaded stem 32 is threadedly received within threaded opening 36 forming a bottleneck portion of passage 38 within the pivot nut 26. The threaded stem 32 is caused to rotate by means of a ratchet wheel 40 which is integral with the stem 32 and is contacted by the spring 42 which is stretched between the two brake shoes to hold them against the adjuster strut 24 and also to prevent accidental rotation of the stem 32 by resisting turning of the ratchet wheel 40. It is possible to overcome the spring resistance to turning of the wheel 40 when a screwdriver or similar tool is brought to bear against the outer periphery of the serrated wheel 40 and the wheel is turned to advance the stem 32 either to the right when it is desired to spread the two brake shoes, or to the left to reduce clearance between the brake shoe ends thereby obtaining a proper running clearance between the lining 20 and the opposed cylindrical surface 44 of the drum 46. Also integral with the stem 32 is a projection 47 having a groove 48 wherein nibs 50 are received which are formed from socket 52 fitting over the projection 47. The socket 52 includes a slotted end 54 fitting over web 56 of the shoe 18 and thereby preventing rotation of the socket 52. The nibs 50 are formed by staking indentations 58 in the periphery of the socket 52 at spaced circumferential locations. The socket bears against the wheel 40 so that force is transmitted between the shoes independently of the nibs 50 which function only to keep the socket 52 and stem 32 together.

When the brake is applied, assuming counterclockwise rotation of the drum (FIGURE 1) the brake shoe 16 when engaged with the cylindrical surface 44 of the drum transmits braking force through the strut 24 to the brake shoe 18 thereby applying the shoe 18 outwardly against the drum, the two shoes anchoring together through the end of shoe 18 bearing against anchor 59. The strut 24 thus serves the dual function of transmitting applying force from one shoe to the other, i.e., from shoe 16 to shoe 18 in counterclockwise rotation of the drum and from shoe 18 to shoe 16 in clockwise rotation of the drum and also functions as an adjuster by determining the clearance between the adjacent shoe ends connected by the strut and thereby determining the running clearance between the lining of the two shoes and their opposed drum surface 44.

It was previously the practice to form the passage 38 as a uniform diameter passage and then thread the entire opening length from the open end of the passage to its blind end. Owing to the large ratio of length to diameter of such threaded opening, the thread diameter was nonuniform from one end to the other and also there was a high incidence of tool breakage because bits of metal which were cut out to form the threaded opening became lodged within the passage and broke both tool and part.

The tool breakage factor added objectionably to the cost of making the part and the nonuniformity of thread opening produced many instances where the threads of the stem 32 would freeze and resist unduly turning of the adjuster. While most of the time the threaded connection could be broken loose when the adjuster was manually operated, the problem became more objectionable when an automatic adjuster such as the one shown and described in U.S. Patent No. 2,938,610, issued May 31, 1960, is used wherein only a limited force is available for operating the adjuster and providing the necessary motive force for producing rotation of the adjuster stem 32.

The described defects in the prior method of construction are overcome in the present invention by forming a bottleneck construction at the open end of the passage 38 and threading only the bottleneck portion of the sleeve 26. Since the threaded bottleneck portion is approximately one and one-half times the diameter of the passage opening the strength of the threaded connection between the pivot nut 26 and stem 32 is substantially the same as a threaded connection extending through the length of the threaded sleeve 26. Moreover, when the lining 20 becomes substantially worn and the stem is moved outwardly from the sleeve 26 so that even where there is a threaded connection throughout the length of the sleeve, the threaded contact between sleeve 26 and stem 32 reduces approximately to that provided by the present bottleneck construction. Since there is a reduced length of threaded connection between the stem and sleeve there is greater uniformity of fit which can be made sufficiently loose so that it is unlikely to bind at any time with the stem 32 moving to the right or the left. The stem 32 is proportioned so that it passes freely through the larger diameter portion of the passage 38 and if desired, a permanent type lubricant can be provided at the blind end of the passage 38 to lubricate the threads.

Using a bottleneck construction also makes it possible to use a roll tool 85 (FIGURE 7) which impresses threads on the bottleneck portion and effects the threaded configuration, not by a cutting and removing material technique but rather by displacing the metal into crest and root diameters. In other words, the metal is shaped into a threaded configuration rather than cutting. Details of the tool which is usable for accomplishing this is disclosed in Re. 24,572 published December 2, 1958, entitled "Fluteless Swaging Tap."

Figure 3:
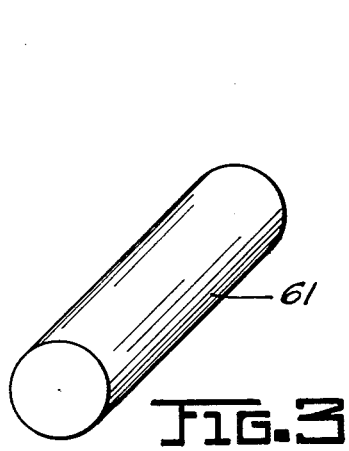
FIGURE 3 illustrates the slug of metal material from which the pivot nut is formed.
Figure 4:
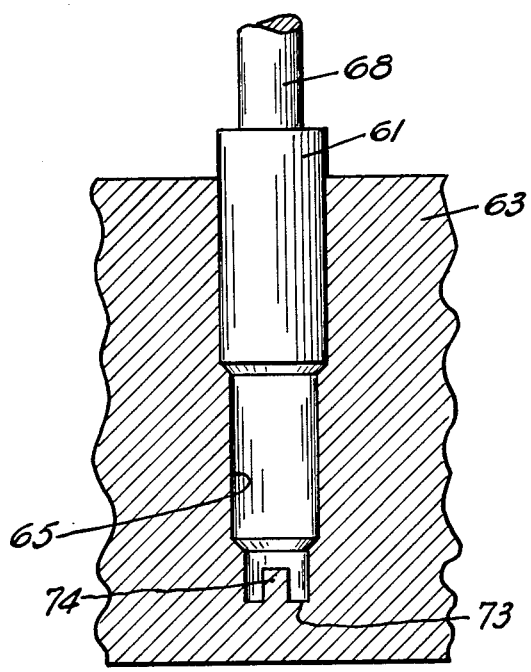
FIGURE 4 illustrates the start in process of forming the slug of FIGURE 3 into the sleeve and is illustrated in connection with the die members in their initial position.
Figure 5:
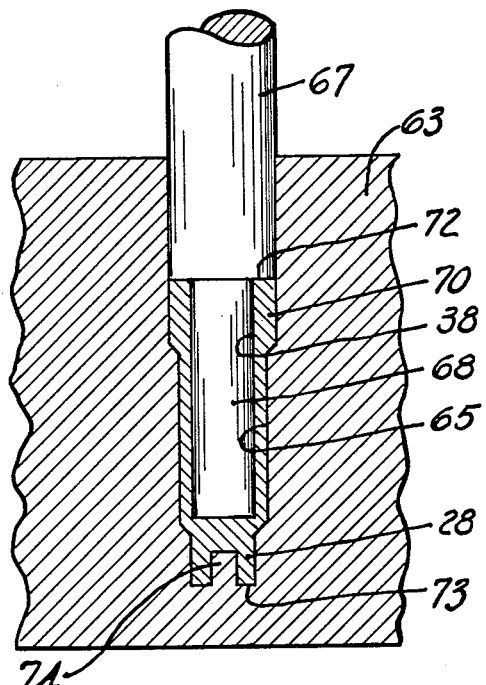
FIGURE 5 shows the die members illustrated in FIGURE 4 following completion of their stroke.
Figure 6:
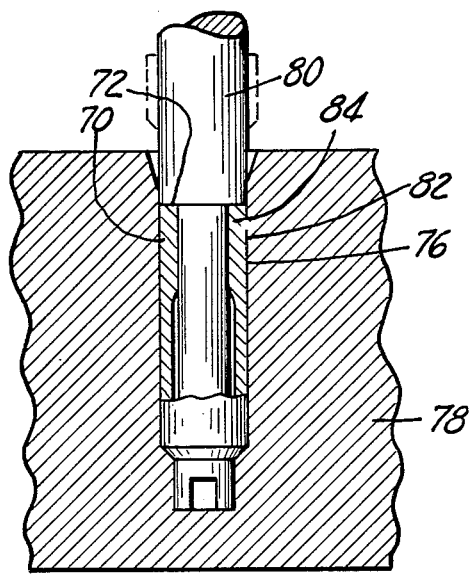
FIGURE 6 illustrates the operation wherein the thickened portion of the sleeve is formed inwardly to provide an interior bottleneck construction at the open end of the passage.

The pivot nut is formed from a cylindrical slug of metal indicated by reference numeral 61 (FIGURE 3). The slug 61 is placed within a female die 63 and is rammed within the die cavity 65 by a stepped diameter male die 67 having a smaller diameter portion 68 which is thrust within slug 61 to form passage 38 and simultaneously form a thickened portion 70 adjacent the open end 72 of the slug which is thereby drawn into a cylindrically shaped form having a slotted end 28. Note that at the bottom of the die cavity 73 there is a land 74 which is used for shaping the notched end of the pivot nut. Shaping the slug 61 into a cylindrical body with a thickened portion 70 and slotted end 28 is all accomplished in a single operation and the male die 67 is thereafter raised and the port ejected from die 63. The thickened portion 70 is then compressed within opening 76 of die 78 by a plunger 80 (FIGURE 6) so that the outer diameter 82 of the sleeve is made of uniform diameter and in this manner there is produced a bottleneck configuration 84 at the open end 72 of the passage 38.

Figure 7:
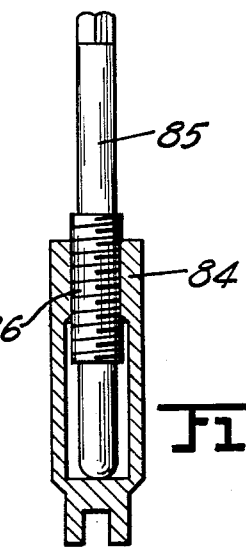
FIGURE 7 shows the thread rolling operation which follows the step shown in FIGURE 6.
Figure 8:
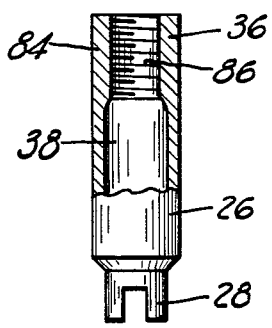
FIGURE 8 illustrates the final pivot nut when it is completely formed and threaded.

Referring next to FIGURE 7, the bottleneck portion 84 is then roll threaded by a tool 85 to form threads 86 and the finished part then appears as shown in FIGURE 8.

Figure 9:
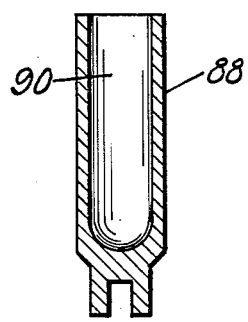
FIGURE 9 is a longitudinal section view of a sleeve shown partially completed and following its removal from dies similiar to those shown in FIGURES 4 and 5.
Figure 10:
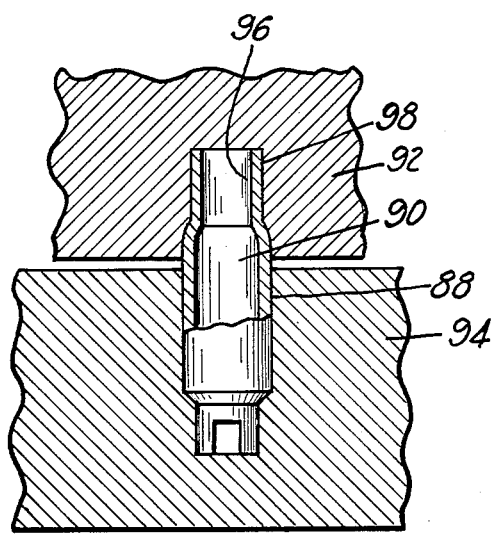
FIGURE 10 illustrates two die members which are shown swaging the open end of the sleeve in FIGURE 9.
Figure 11:
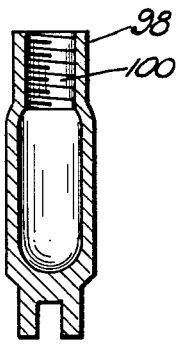
FIGURE 11 illustrates the pivot nut shown in FIGURE 10 after it is removed from the dies and thereafter roll threaded.

Referring next to the embodiment shown in FIGURES 9, 10 and 11, it is possible to form the pivot nut with a uniform outer diameter surface 88 and passage 90 and then, by means of dies 92 and 94 (FIGURE 10) form the open end 96 of the pivot nut inwardly to a bottleneck shape 98 which is then threaded as indicated by reference numeral 100 in FIGURE 11.

Figure 2:
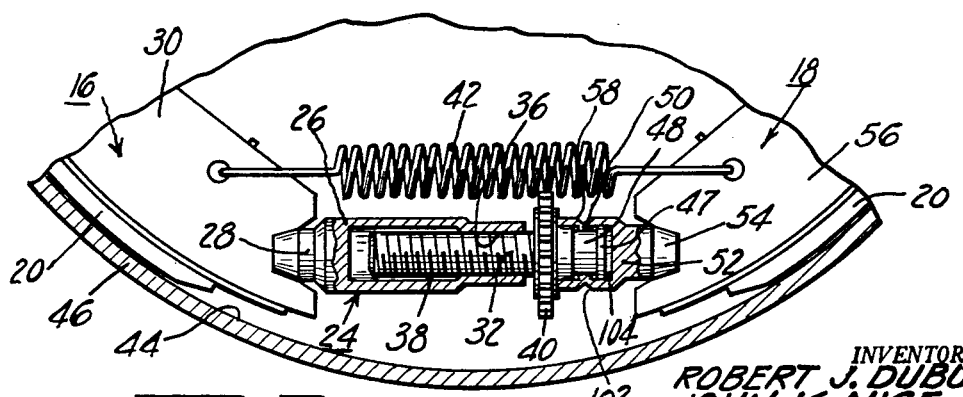
FIGURE 2 is an enlarged detail view of the adjuster shown in FIGURE 1 but illustrating the adjuster in longitudinal section.

To assemble the strut 24, the socket 52 is fitted over the unthreaded or right hand end of strut 32 (FIGURE 2) and is taked at circumferentially spaced points 102 to force metal nibs 50 within groove 48 thereby retaining the stem 32 and socket 52 together. Permanent lubricant can be provided within the interior of the socket 46 to ensure that the stem can turn freely within the socket. The socket opening 104 is proportioned so that it bears directly against the serrated wheel 40 and none of the force is transmitted between the brake shoes through the nibs 50.

The stem 32 is then screwed within pivot nut 26, the ends 28 and 54 fitted to their respective shoes 16, 18 and the adjuster wheel 40 thereafter turned to obtain the necessary distance between shoe ends 30, 56 for establishing a proper running clearance between the shoes and drum 46.

Once the threaded stem moves past the threaded bottleneck portion, it moves freely within the larger diameter portion of the passage 38. Inasmuch as the threads are confined only to the bottleneck portion, the thread diameter is quite uniform and can be made to ensure free rotational movement of the stem 32 at all times wherever looseness is necessary. In addition, the process of roll threading only at the bottleneck portion ensures that metal particles are not produced to cause tool breakage. As a result, it is possible to form the threaded opening much quicker and easier to form without the previous incidence of breakage to tool and part. I do not intend therefore to limit the invention to roll threading the bottleneck portion of the passage.

Although only certain selected embodiments have been chosen to illustrate the invention, it will be understood that these embodiments are examples of the invention and are in no sense restrictive thereof. It is reasonably to be expected that those skilled in the art can make numerous revisions and adaptations of the invention to suit individual design requirements and it is intended that such revisions and variations that embody the herein disclosed principles will be included within the scope of the following claim as equivalents of the invention.

What is claimed is:

A process for producing a pivot nut of a brake adjuster comprising the steps of: upsetting metal from a slug to form a member including a tubular portion which is closed at one end by a solid portion of said member which has a slot at its outermost end thereof, open at the other end, and has an inner wall of generally uniform diameter, and an outer wall of generally uniform diameter except at its open end portion which is of a larger diameter; upsetting the open end portion of the tubular member to decrease the diameter of the outer wall of said open and portion to said generally uniform diameter of said outer wall and decrease the diameter of the inner wall of said open end portion; and upsetting metal from the inner wall of said end portion to form threads thereon.

References Cited in the file of this patent

UNITED STATES PATENTS

| | | |
|---|---|---|
| 1,519,166 | Rauch | Dec. 16, 1924 |
| 1,618,544 | McKinney | Feb. 22, 1927 |
| 1,672,082 | Oakley | June 5, 1928 |
| 1,709,328 | Stover | Apr. 16, 1929 |
| 2,026,133 | Mapes | Dec. 31, 1935 |
| 2,261,056 | Dunn | Oct. 28, 1941 |
| 2,424,655 | Goepfrich | July 29, 1947 |
| 2,728,135 | Rockwell | Dec. 27, 1955 |
| 2,776,580 | Tack | Jan. 8, 1957 |
| 2,917,823 | Fletcher | Dec. 22, 1959 |
| 3,017,962 | Ingres | Jan. 23, 1962 |
| 3,050,755 | Welles | Aug. 28, 1962 |

UNITED STATES PATENT OFFICE
CERTIFICATE OF CORRECTION

Patent No. 3,143,795                        August 11, 1964

Robert J. Dubuc et al.

It is hereby certified that error appears in the above numbered patent requiring correction and that the said Letters Patent should read as corrected below.

Column 4, line 38, for "taked" read -- staked --; column 5, line 11, for "and" read -- end --.

Signed and sealed this 23rd day of February 1965.

(SEAL)
Attest:

ERNEST W. SWIDER
Attesting Officer

EDWARD J. BRENNER
Commissioner of Patents